Nov. 7, 1939.  W. E. FIREHAMMER  2,179,120
CONTROL DEVICE FOR HEATING SYSTEMS
Filed April 20, 1938  2 Sheets-Sheet 1
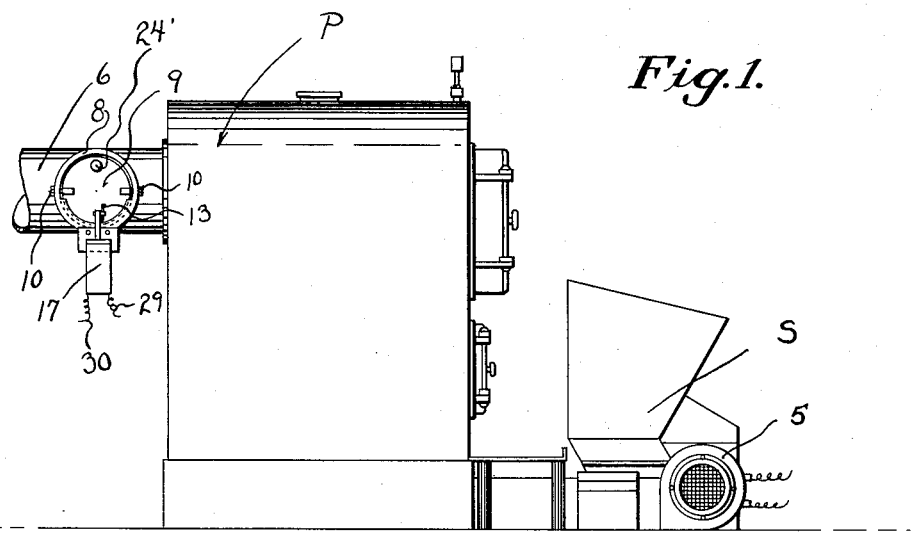
Fig.1.
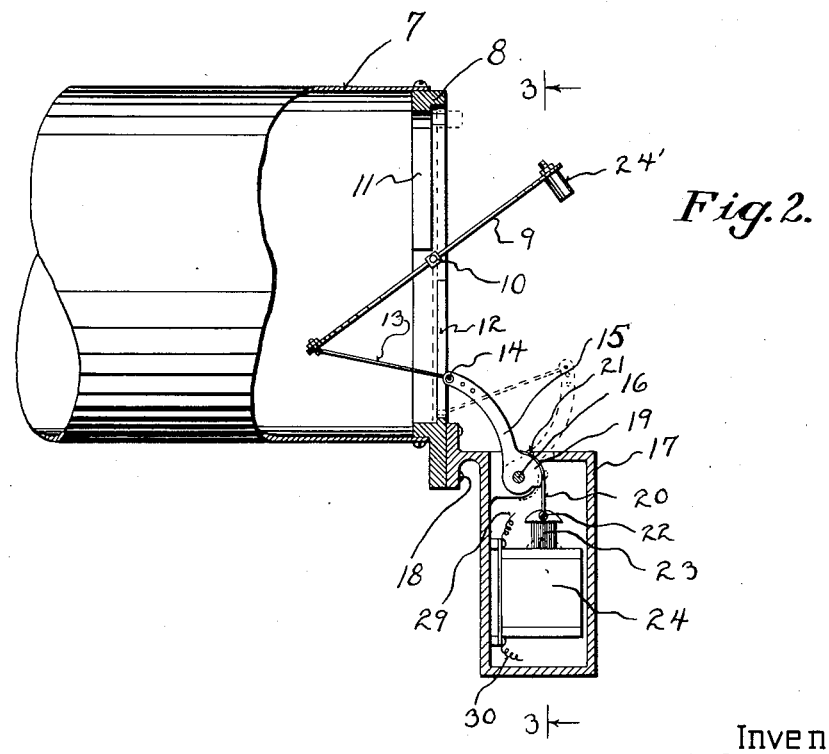
Fig.2.
Inventor.
Welton E. Firehammer
By 
Attorneys.

Nov. 7, 1939.                W. E. FIREHAMMER                2,179,120
                      CONTROL DEVICE FOR HEATING SYSTEMS
                      Filed April 20, 1938        2 Sheets-Sheet 2
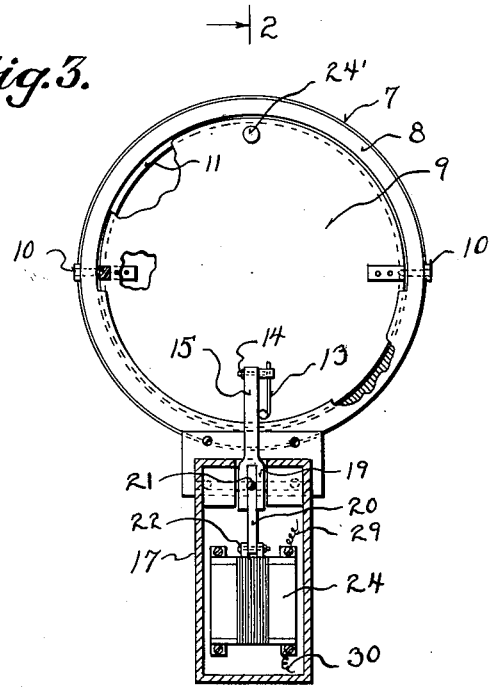
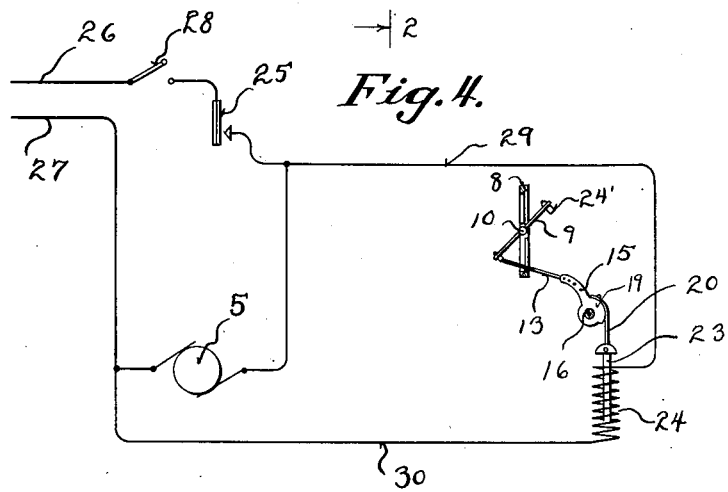
Inventor.
Welton E. Firehammer
Attorneys.

Patented Nov. 7, 1939

2,179,120

UNITED STATES PATENT OFFICE 2,179,120

CONTROL DEVICE FOR HEATING SYSTEMS

Welton E. Firehammer, Oshkosh, Wis.

Application April 20, 1938, Serial No. 203,092

2 Claims. (Cl. 126—285)

This invention appertains to furnaces, and more particularly to a novel control device for a heating system, such as a hot air, hot water, or vapor heating system.

One of the primary objects of my invention is to provide novel means for preventing rapid cooling of a heating plant and loss of heat into the stack after the required temperature has been reached and the supply of fuel to the plant has been cut off.

Another salient object of my invention is to provide a damper in the smoke-pipe, with novel means for automatically actuating the same from the circuit of the thermostat utilized for controlling fuel supply to the heating plant, whereby the damper will be closed during the supply of fuel to the heating plant, and open when the supply of fuel is cut off.

A further object of my invention is to provide means for so disposing the damper relative to the smoke-pipe that the active cross-sectional area of the smoke-pipe is never diminished, irrespective of the operating positions of the damper.

A further important object of my invention is to provide novel means for actuating the damper from a solenoid arranged in the circuit for the control thermostat, embodying an operating lever so arranged and disposed that the linkage connection between the lever and solenoid will remain at all times in a constant perpendicular line to the core of the solenoid, whereby to facilitate the operation of said damper.

A still further object of my invention is to provide a damper control for heating plants of the above character, which will be durable and efficient in use, one that will be simple and easy to manufacture, and one which can be incorporated with a conventional heating plant at a small cost.

With these and other objects in view, the invention consists in the novel construction, arrangement, and formation of parts, as will be hereinafter more specifically described, claimed, and illustrated in the accompanying drawings, in which drawings:

Figure 1 is a side elevational view of a conventional heating plant, showing my invention incorporated therewith.

Figure 2 is a detail sectional view through the improved damper and operating mechanism therefor, taken substantially on the line 2—2 of Figure 3, looking in the direction of the arrows.

Figure 3 is a sectional view taken at right-angles to Figure 2 and substantially on the line 3—3 of Figure 2, looking in the direction of the arrows.

Figure 4 is a diagrammatic view illustrating the means of incorporating the damper-operating mechanism in the temperature-control circuit for the furnace.

Referring to the drawings in detail, wherein similar reference characters designate corresponding parts throughout the several views, the letter P generally indicates a heating plant, which can be of any preferred character or make. In the present instance, the heating plant has been shown to be of the hot water or vapor heating type, and is provided with a coal stoker S. The stoker is provided with the usual electric motor 5 for feeding the coal and air to the furnace. The smoke-pipe 6 leads from the furnace in the ordinary manner to the stack or chimney (not shown).

While I have illustrated a heating plant provided with a stoker, it is to be understood that my novel damper control is to be used with heating plants of the oil burner or gas burner types.

Connected with the smoke-pipe 6 between the furnace and the stack or chimney is a laterally extending air inlet sleeve 7 having mounted in its outer end a damper ring or annular frame 8. A damper plate or valve 9 is mounted in the frame 8 for rocking movement on diametrically disposed rock pins or stub shafts 10. Thus, the damper 9 is mounted on a horizontal axis intermediate its upper and lower ends for free swinging movement. The rear edge of the ring or frame 8 has formed thereon a semi-circular stop flange 11, against which the damper is adapted to abut when the same is in its closed position. A similar flange 12 is formed on the lower end of the ring or frame, and the damper abuts this lower flange when the same is in its closed position.

Hingedly connected to the lower end of the damper 9 is a connecting rod 13, and this rod is, in turn, pivotally connected, by means of a pin 14, with the upper end of a rock lever or crank 15. The upper end of the lever or crank 15 can be provided with a plurality of openings, so that the pivot pin can be placed in a preferred selected position, so as to permit the adjustment of the damper relative to the lever or crank-arm. This lever is rockably mounted at its lower end on a rock shaft 16 carried by a supporting housing 17. The housing 17 is bolted, as at 18, to the lower end of the frame 8. The hub of the lever, at one side of its long arm, is provided with an arcuate face 19, which in reality constitutes the short operating arm of the lever.

A flexible strap 20 extends over the arcuate surface 19 and is secured at its extreme upper end to said surface adjacent the long arm, as at 21. The lower end of the flexible strap is, in turn, connected, as at 22, to the upper end of the movable core 23 of a solenoid 24. This solenoid is received within the housing 17 and is protected thereby.

From the construction so far, it can be seen that when the solenoid is energized, the core 23 will be pulled downwardly, which will exert a straight downward pull on the strap 20. The strap, in turn, will rock the lever 15 and move the damper 9 toward its closed position.

When the solenoid is de-energized, the damper tends to return to its open position automatically, and a weight 24' is secured to the upper end of the damper 9. This weight extends outwardly and beyond the pivot of the damper, and, thus, the weight overbalances the damper.

In accordance with my invention, I electrically connect the solenoid in the circuit for the control thermostat 25 of the heating plant. The thermostat 25 is located at the desired point in the building to be heated. The thermostat operates to cut off the motor 5 of the heating plant when the heat becomes too great, and to energize the motor when the temperature drops below a predetermined degree. The motor 5 is connected to a source of electric energy by means of power lines 26 and 27. The thermostat 25 is interposed in the line 26, and this line can also be provided with a manually operated switch 28. Connected to the lines 26 and 27 are electric conduit wires 29 and 30, which lead to the terminals of the solenoid 24.

Assuming that the switch 28 is closed and the temperature of the building falls below a predetermined degree, the thermostat 25 will function to close the circuit through the motor 5 to bring about the feeding of fuel to the furnace. As soon as the circuit is closed by the thermostat 25, the solenoid 24 is energized; and, consequently, the core 23 will be drawn downward and the damper will close, as heretofore explained. When the desired temperature has been reached, the thermostat 25 will open the circuit, and the weight 24' will move the damper to an open position.

The damper, due to its simple design, can be readily installed in the smoke-pipe and functions as follows: When the thermostat 25 calls for heat, the circuit to the motor 5 will be closed, and at the same time the solenoid 24 is energized from the same source of current operating the damper. The damper closes to any predetermined shut position, providing a flue gas velocity of proper speed to prevent the accumulation of stagnant and quiescent gases, which would tend to act as a resistance to heat transfer. The burner continues to operate with full draft or draft partly by-passed, according to general conditions. When the thermostat opens the motor circuit, the damper opens by gravity to its predetermined open position. This will positively check the stack by by-passing the draft to an exterior source.

This action in the case of a stoker-fired heating plant puts the accumulated fire bed in a dormant stage after the thermostat has been satisfied, preventing further generation of heat. This, consequently, holds room temperatures at the levels desired. In case of an oil burner, or where gas is used as fuel, the damper, in its action, traps the boiler temperature upon completion of a thermostatic call, preventing the otherwise rapid cooling and subsequent loss of heat into the stack.

My device has many advantages which can be readily recognized by those skilled in the art.

While I have herein shown and described what I consider the preferred manner of carrying out the invention, the same is merely illustrative, and I contemplate all changes and modifications which come within the scope of the claims appended hereto.

I claim:

1. In a furnace control, a flue pipe for the furnace having a laterally extending inlet, a damper ring connected to said inlet, a damper rockably mounted intermediate its ends in said ring for controlling said inlet, a weight secured to the damper for normally moving the damper to an open position, a housing arranged below the inlet and carried by said ring, a solenoid in said housing, a crank rockably mounted in said housing above the solenoid having an upwardly extending arm, a link pivotally connected to the lower end of the damper and to said arm, said crank also having a curved surface disposed at one side of the pivot point of the crank and at one side of the arm and above the center of the solenoid, and a flexible strap connected to said core and connected at its upper end to said curved surface.

2. In a furnace control, a flue pipe for the furnace having a laterally extending inlet, a damper ring connected to said inlet, a damper rockably mounted intermediate its ends in said ring for controlling said inlet, a housing arranged below the inlet and carried by said ring, a solenoid in the housing, a crank rockably mounted in said housing above the solenoid having an upwardly extending arm, said arm being adapted to actuate the damper upon movement of the crank in one direction, said crank also having a curved surface disposed at one side of the pivot point of the crank, and at one side of the arm and above the center of the solenoid, and a flexible strap connected to said core and connected at its upper end to said curved surface.

WELTON E. FIREHAMMER.